United States Patent [19]

Robinson et al.

[11] 4,311,354

[45] Jan. 19, 1982

[54] METER DISCONNECT ADAPTOR

[75] Inventors: Darrell Robinson, Milford; John C. Bell, Livonia, both of Mich.

[73] Assignee: Ekstrom Industries, Inc., Farmington Hills, Mich.

[21] Appl. No.: 129,571

[22] Filed: Mar. 12, 1980

[51] Int. Cl.³ .................... H01R 13/44; H01R 13/60; G01R 11/04
[52] U.S. Cl. ................. 339/36; 174/138 F; 361/371
[58] Field of Search ...... 174/138 F; 324/110, 324/149, 156; 339/31 B, 36, 37, 38, 198 M; 361/364–375

[56] References Cited

U.S. PATENT DOCUMENTS 3,614,708 10/1971 Koepfgen ............... 361/371

FOREIGN PATENT DOCUMENTS 552662 1/1923 France ............... 174/138 F
1441271 6/1976 United Kingdom ......... 339/38

Primary Examiner—Laramie E. Askin
Attorney, Agent, or Firm—Robert E. Ross

[57] ABSTRACT

A meter disconnect adaptor for assembly into a residential electric meter socket. The adaptor has a base with a peripheral configuration which allows it to be used with either a ringless type of meter box, or in a ring type of mounting, and has blade simulating members extending from one side of the base and resilient fingers extending from the other side of the base for receiving contact blades of the electric meter. In one embodiment of the invention the adaptor has a group of resilient fingers arranged to allow assembly of the meter therein in any one of a number of orientations.

6 Claims, 6 Drawing Figures

METER DISCONNECT ADAPTOR

BACKGROUND OF THE INVENTION

In the electrical utility industry, it is common to use detachable or socket type watthour meter assemblies to measure the electrical power consumption of a residence or a commercial establishment. Often, for various purposes, it is desired to provide an adaptor between the meter socket and the meter. A function of one type of adaptor is to disconnect the electrical service to the residence or commercial establishment. When electrical service is to be disconnected, it is usually desirable that the meter be left in the assembly for future service reconnection.

Various devices have been used for this purpose. Internal switches have been found too costly. Plastic sleeves have sometimes been placed over the meter contact blades, and the meter re-inserted into the meter socket; however, this method leaves no visual indication that the meter is disconnected. Another method has involved the use of a pair of plastic adaptors having rearwardly extending plastic blades for insertion into the meter socket jaws, and forwardly facing slots, radially spaced from the plastic blades for receiving the meter contact blades, so that the contact blades of the assembled meter are insulated from the meter socket jaw contacts, and the meter is disposed at an angle to its normal position, giving visual indication that the meter is not connected. Such a device is shown in U.S. Pat. No. 3,614,708 issued Oct. 19, 1971.

However, such devices have found only limited usage, because of the fact that they cannot be used with all types of meters. In some types of meter sockets, the rotation of the meter required by the adaptor causes mechanical interference between portions of the meter and portions of the socket. In other types of sockets the presence of terminal supporting crossbars prevents assembly of the adaptors into the socket contacts.

Other functions of meter adaptors are to allow the use of 3 wire meters on 2 wire sockets and vice versa, for connecting recording voltmeters, or to provide internal switching devices for controlling the power to the circuits.

BRIEF SUMMARY OF THE INVENTION

The object of this invention is to provide an adaptor for assembly into a meter socket, to receive a meter, said adaptor being capable of use with either a ringless or ring-type of mounting.

One form of the adaptor comprises a base and a forwardly extending peripheral wall to receive the rear end of a meter.

The wall has peripheral flanges that allow the adaptor to be used in either a ringless meter box, with means on the flange to mount the meter therein with a ring, or in a ring-type mounting, in which case the adaptor is mounted onto the meter box with a ring and the meter is mounted onto the adaptor by an additional ring. In one embodiment of the adaptor, a series of resilient fingers are positioned on the base to receive and resiliently grip the rearwardly extending blades of a meter. The resilient fingers may be so oriented that when the meter is assembled therewith, the meter is disposed at an angle to its usual orientation. In another embodiment of the invention, the resilient fingers may be so arranged in sets so that they form at least two blade-receiving slots, so that the meter may be assembled therein in one of at least two orientations.

DESCRIPTION OF THE ILLUSTRATED EMBODIMENT

Figure 1:
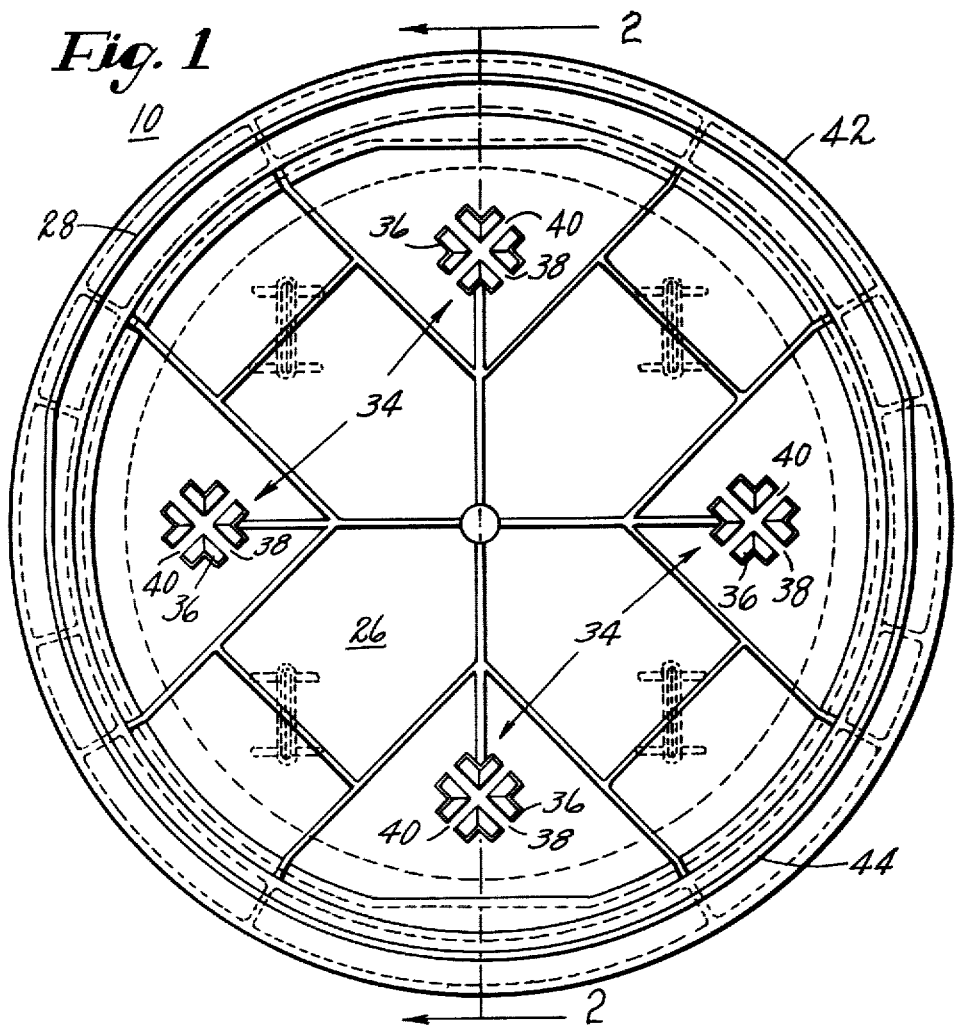
FIG. 1 is a front plan view of a meter socket adaptor embodying the features of the invention.
Figure 2:
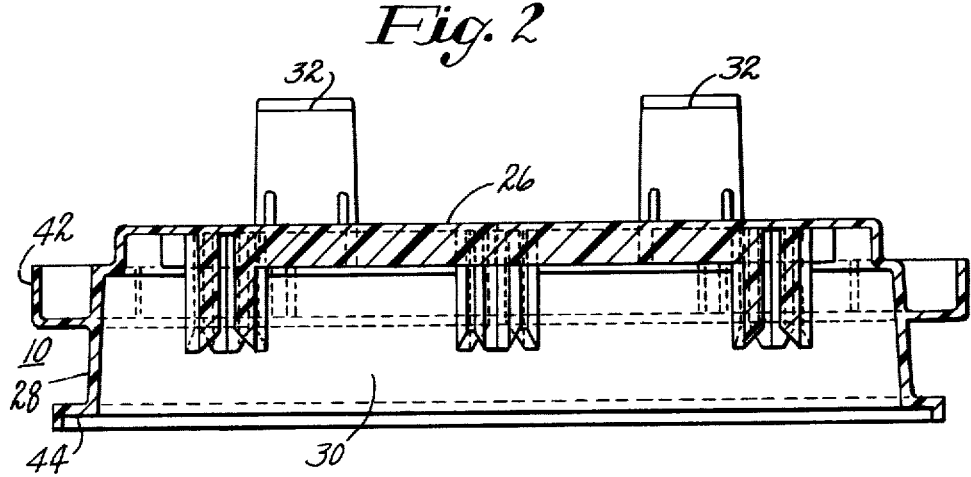
FIG. 2 is a view in section taken on line 2—2 of FIG. 1.

Referring to FIGS. 1-5 of the drawing, there is illustrated one type of meter socket adaptor 10, which is designed for assembly with a meter socket 12, and to receive a meter 14, to enable the meter to be mounted into the socket without making electrical contact with the socket terminals.

Figure 3:
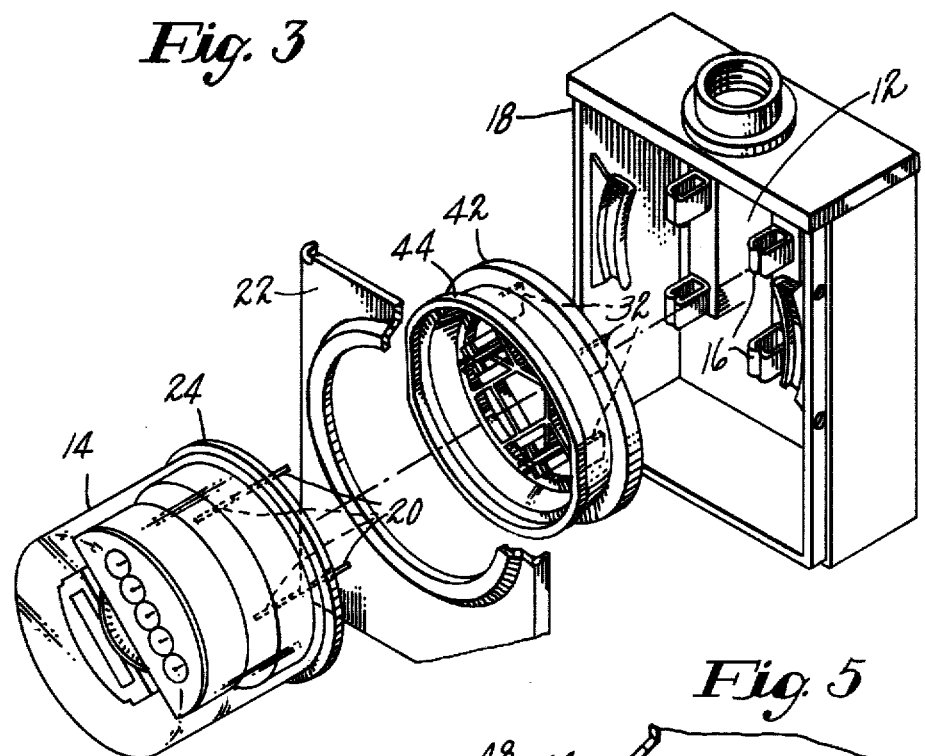
FIG. 3 is a perspective view of the device of FIG. 1 in position for assembly into a meter socket of the ringless type.
Figure 4:
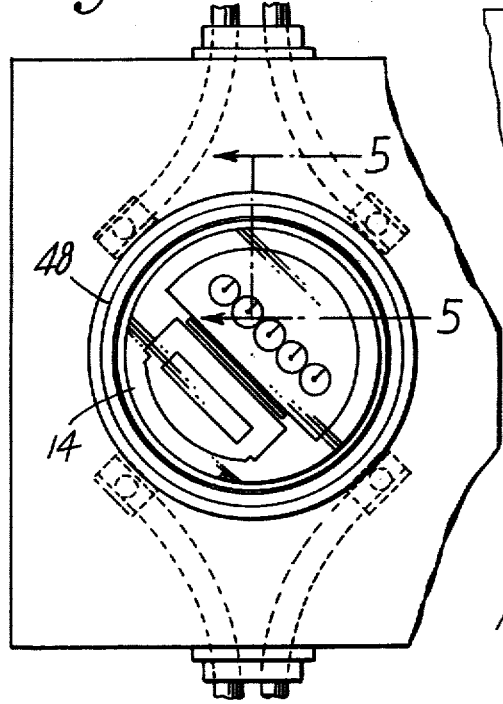
FIG. 4 is a front plan view of the assembly of FIG. 3 with a meter assembled therewith.
Figure 5:
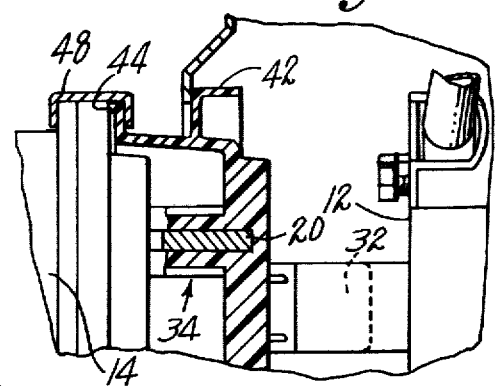
FIG. 5 is an enlarged view in section of a portion of the assembly of FIG. 4, taken on line 5—5 of FIG. 4.

The meter socket 12 of FIGS. 3-5 is a ringless type which has terminals 16 disposed inside a box 18. The terminals 16 are intended to receive contact blades 20 extending from the rear of the meter. The meter is normally retained in place by an apertured cover 22, which bears against the meter mounting flange 24.

The adaptor 10 is preferably formed of a single piece of molded plastic, and comprises a base plate 26 with a peripheral wall 28 extending forwardly therefrom forming an internal cavity 30 to receive the rear end of a meter in a manner to be described.

Formed integrally with the base and extending rearwardly therefrom are blades 32, which are sized, shaped, and positioned to simulate the contact blades 20 of the meter.

Projecting forwardly from the base are a plurality of groups 34 of resilient fingers 36. Each finger 36 is generally V-shaped with the apexes pointing toward a common central point, forming two intersecting slots 38 and 40.

The spacing of the fingers is such that the slots 38 and 40 have a width that allows them to receive and frictionally engage the contact blades 20 of the meter 14.

The groups 34 of fingers are preferably molded integrally with the base 26 and are enclosed within the peripheral wall 28, which protects them from damage during shipment and handling.

The wall 28 is provided with a radially extending bearing flange 42 which has a radial size substantially the same as that of the meter bearing flange 24, so that the adaptor can be mounted in the box 18 in the same manner as a meter, as will appear hereinafter.

The extreme end of the wall 28 is provided with an outwardly turned mounting flange 44. The flange 44 has an overall diameter slightly less than that of the meter flange 24, to enable it to pass through the opening in the box cover 22, yet is large enough to be engaged by a meter clamping ring, as will appear hereinafter.

As illustrated in FIGS. 3 and 5, when the adaptor is used to disconnect a meter mounted in a ringless type of socket, the cover 22 of the box 18 is opened and the meter removed. The adaptor is then assembled into the socket by inserting the blades 32 thereof into the terminals 16. The cover 22 is then closed over the adaptor, whereby the adaptor is retained in place in the same manner that a meter is retained in place, by the portion 42 of the adaptor being disposed behind the periphery of the cover opening.

The meter 14 is then assembled with the adaptor by inserting the meter blades 20 into one of the sets of adaptor slots (either 38 or 40) formed by the groups 34 of fingers.

The meter flange 24 thereby seats against the mounting flange 44 and may be retained in assembly by a standard U-shaped mounting ring 48, which encloses the meter flange 24 and the flange 44 on the forward end of the adaptor.

In view of the orientation of the slots 38 and 40, the meter, after such assembly, will be oriented at a 45° angle to the vertical, thereby giving a visual indication to service personnel that the meter is not connected. The fact that the meter may be mounted in the adaptor in any one of four positions allows the position of the meter to convey information about the status of the electric service at that location.

The adaptor may also be used to disconnect meters which are mounted on so-called ring type boxes. In such installations a meter box 50 is provided with a meter aperture 52, which has a peripheral flange 54 which has an overall diameter substantially equal to that of the meter flange 24. The meter is retained in place by a U-shaped mounting ring 56.

Figure 6:
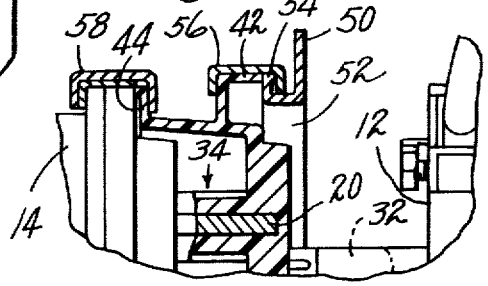
FIG. 6 is a view in elevation, partly in section, of the adaptor assembled with a meter and meter socket of the ring type.

When the meter is to be disconnected, the ring 56 is removed, and the adaptor 10 assembled in place of the meter (see FIG. 6). The ring 56 is then replaced so that it encloses the flange 54 of the meter box and the bearing flange 42 of the adaptor, thereby retaining the adaptor in place.

The meter may then be assembled onto the adaptor as previously described, inserting the blades 20 into a set of slots (38 or 40) of the adaptor, and assembling a second U-shaped ring 58 over the meter flange 24 and the adaptor flange.

Although in the illustrated embodiment the slots 38 and 40 are so oriented that a meter assembled into the adaptor becomes oriented at a 45° angle to the vertical, it may be desirable in some cases to omit this feature, and provide only a single slot allowing normal orientation of the meter.

Instead of being formed of a single piece of plastic, the adaptor may, if desired, be made by the assembly of components of appropriate shape. In such case, the blades 32 and the fingers 36 may be made of metal, provided they are suitably insulated from each other.

An adaptor having the external configuration illustrated and described herein, which allows its use in either ring or ringless type meter sockets, may have internal configuration or apparatus allowing its use for other functions. For example, the rearwardly extending blades 32 and the fingers 36 may be made of conductive material, and may be provided in the adaptor for connection thereto, such as switches to control the power from the line contacts. The blades 32 and fingers 36, if conductive, may be connected to external contacts in the wall of the adaptor for test leads or voltage recorder leads.

Since certain other changes obvious to one skilled in the art may be made in the device without departing from the scope of the invention, it is intended that all matter contained herein be interpreted in an illustrative and not a limiting sense.

We claim:

1. An adaptor for assembly into an electric meter socket in place of a standard watt-hour meter of the type having a peripheral mounting flange, said adaptor comprising a base having a peripheral wall, means projecting from the rear side of the base shaped and positioned to simulate the contact blades of an electric meter for engaging the socket contacts when the adaptor is assembled into the meter socket, and means on the base for receiving contact blades of an electric meter from the forward side of the base, said wall having a first radially extending flange, the forward side of said flange being so axially positioned that when the adaptor is assembled into a meter socket, said forward side is in the same axial position as the forward face of the mounting flange of an electric meter when assembled into said socket, and a second radial flange on the wall forwardly of the first flange and being sized to allow the mounting thereagainst of a meter mounting flange with a U-shaped meter mounting ring.

2. An adaptor as set out in claim 1 in which said first flange comprises a radially extending portion providing said forward side and a portion extending from the outermost edge of the radially extending portion to provide spacing means when said adaptor is assembled into a meter socket of the type in which the meter is mounted with a U-shaped ring.

3. An adaptor for assembly into an electric meter socket in place of an electric meter, comprising a base and a peripheral wall on the base, said wall having mounting means for enabling assembly into a meter socket and means on the forward end thereof for enabling the mounting of an electric meter, means extending rearwardly from the base for frictional engagement in meter socket terminals, and means extending forwardly from the base for receiving and frictionally retaining the contact blades of an electric meter.

4. An adaptor as set out in claim 3 in which said means extending forwardly from the base comprises a plurality of groups of resilient fingers so arranged to form in each group a pair of intersecting slots, each of which is dimensioned to receive a meter contact blade in frictional engagement, whereby a meter may be inserted into said adaptor in more than one orientation.

5. An adaptor as set out in claim 4 in which said groups of resilient fingers are enclosed by said peripheral wall.

6. An adaptor for assembly into an electric meter socket of the residential type, in place of a standard watt-hour meter having a peripheral mounting flange, said adaptor being capable of assembly with a meter box of either the ringless mounting type or the ring mounting type, comprising a base, means extending rearwardly from the base for engaging the meter socket, and means extending forwardly from the base for receiving the contact blades of said watt-hour meter, a first radially extending member on the periphery of the base, said first radially extending member having an overall diameter, radial thickness, and axial thickness that is substantially the same as the corresponding dimensions of the peripheral mounting flange of said watt-hour meter, and a second radially extending member disposed about the base forwardly of the first member, said second radially extending member having an overall diameter and axial thickness simulating a mounting flange of a meter socket box of the type that uses a contractable ring for mounting a meter.

* * * * *